(12) United States Patent
Enomoto

(10) Patent No.: US 8,477,271 B2
(45) Date of Patent: Jul. 2, 2013

(54) LIQUID CRYSTAL DISPLAY DEVICE

(75) Inventor: Hiromi Enomoto, Osaka (JP)

(73) Assignee: Sharp Kabushiki Kaisha, Kyoto (JP)

( * ) Notice: Subject to any disclaimer, the term of this patent is extended or adjusted under 35 U.S.C. 154(b) by 142 days.

(21) Appl. No.: 13/141,088

(22) PCT Filed: Aug. 5, 2009

(86) PCT No.: PCT/JP2009/003743
§ 371 (c)(1),
(2), (4) Date: Jun. 21, 2011

(87) PCT Pub. No.: WO2010/073427
PCT Pub. Date: Jul. 1, 2010

(65) Prior Publication Data
US 2011/0255039 A1  Oct. 20, 2011

(30) Foreign Application Priority Data
Dec. 26, 2008  (JP) ................................. 2008-334594

(51) Int. Cl.
*G02F 1/1335* (2006.01)
(52) U.S. Cl.
USPC .......................................... 349/113; 349/114
(58) Field of Classification Search
USPC ........................................... 349/113, 114, 58
See application file for complete search history.

(56) References Cited

U.S. PATENT DOCUMENTS

| | | | |
|---|---|---|---|
| 6,341,002 B1* | 1/2002 | Shimizu et al. ............... | 349/119 |
| 7,986,394 B2 | 7/2011 | Kamoshida | |
| 2002/0140886 A1 | 10/2002 | Sugiura et al. | |
| 2004/0144754 A1 | 7/2004 | Itami et al. | |
| 2005/0134768 A1* | 6/2005 | Sugiura et al. ............... | 349/113 |
| 2007/0146616 A1* | 6/2007 | Nouchi et al. ............... | 349/155 |
| 2008/0137013 A1 | 6/2008 | Kamoshida | |
| 2008/0303976 A1 | 12/2008 | Nishizawa et al. | |
| 2009/0148616 A1 | 6/2009 | Itami et al. | |
| 2009/0161048 A1* | 6/2009 | Satake et al. ................. | 349/110 |
| 2011/0102721 A1* | 5/2011 | Enomoto ...................... | 349/137 |

FOREIGN PATENT DOCUMENTS

| | | |
|---|---|---|
| JP | 11-295750 A | 10/1999 |
| JP | 2002-221716 A | 8/2002 |
| JP | 2007-193077 A | 8/2007 |
| JP | 2008-145778 A | 6/2008 |
| JP | 2008-198481 A | 8/2008 |
| RU | 2 031 424 C1 | 3/1995 |

OTHER PUBLICATIONS

English translation of Official Communication issued in corresponding Russian Patent Application No. 2011131059, mailed on Jul. 18, 2012.
Official Communication issued in International Patent Application No. PCT/JP2009/003743, mailed on Sep. 8, 2009.
Enomoto, "Liquid Crystal Display Device," U.S. Appl. No. 13/001,635, filed Dec. 28, 2010.

* cited by examiner

*Primary Examiner* — Edward Glick
*Assistant Examiner* — Mark Teets
(74) *Attorney, Agent, or Firm* — Keating & Bennett, LLP

(57) ABSTRACT

A liquid crystal display device includes a first substrate having a plurality of pixels defined thereon, each of which is provided with a reflection layer, a second substrate disposed opposite the first substrate, and a display surface which displays images by the pixels, where the display surface is curved in one direction, and each of the reflection layers is formed so that a reflectance of light reflected from each of the reflection layers in a direction normal to the display surface is higher in both edge portions in a curvature direction than in a middle portion in the curvature direction on the display surface.

5 Claims, 13 Drawing Sheets

LIQUID CRYSTAL DISPLAY DEVICE

TECHNICAL FIELD

The present invention relates to liquid crystal display (hereinafter referred to as "LCD") devices.

BACKGROUND ART

A transmissive LCD device is configured such that light of a backlight unit is transmitted through an LCD panel having a pair of substrates bonded together, and images are generated by the transmitted light. In addition to the transmissive LCD devices, reflective and transflective LCD devices are conventionally known. A reflective LCD device is configured such that light of a front light unit, or external light, incident upon an LCD panel is reflected from a substrate opposite the one in the incident side, and images are generated by the reflected light. A transflective LCD device is configured such that images are generated by using both the transmitted light and the reflected light.

The reflective and the transflective LCD devices are each provided with a reflection layer to reflect light in each pixel of the LCD panel. The surface of each reflection layer is formed with a homogeneous raised and recessed profile in each pixel in order to scatter the light incident from the surroundings, and to uniformly reflect the light toward the front of the LCD device, and the raised and recessed profile of each reflection layer is formed so that the reflectance of light in the direction normal to the display surface is relatively high to allow bright display (see, e.g., Patent Document 1).

CITATION LIST

Patent Document

PATENT DOCUMENT 1: Japanese Patent Publication No. 2002-221716

SUMMARY OF THE INVENTION

Technical Problem

However, if a flat LCD panel is transformed only to a curved shape in order to produce a curved reflective or transflective LCD device, the direction of light reflected uniformly from each reflection layer varies along the curved shape of the LCD panel, and thus the reflectance of light in the direction toward the front of the LCD device is likely to decrease along the directions from the middle portion to the both edge portions in the curvature direction on the display surface. Accordingly, a curved LCD device has a problem in that brightness may vary along the curvature direction of the display surface.

The present invention was made in view of the above problem, and it is an object of the present invention to reduce variation in brightness and to improve display quality in curved LCD devices.

Solution to the Problem

In order to achieve the above object, in the present invention, the reflection layer provided in each pixel is formed so that the reflectance of light reflected from each reflection layer in the direction normal to the display surface is higher in both edge portions in the curvature direction than in a middle portion in the curvature direction on the display surface.

Specifically, a liquid crystal display device according to the present invention includes a first substrate having a plurality of pixels defined thereon, each of which is provided with a reflection layer, a second substrate disposed opposite the first substrate, and a display surface configured to display images by the pixels, where the display surface is curved in one direction; and each of the reflection layers is formed so that a reflectance of light reflected from each of the reflection layers in a direction normal to the display surface is higher in both edge portions in a curvature direction than in a middle portion in the curvature direction on the display surface.

As used herein, the term "curvature direction" means the direction along the curvature of the display surface.

With this configuration, each of the reflection layers is formed so that the reflectance of light reflected from each of the reflection layers in the direction normal to the display surface is higher in both edge portions in the curvature direction than in a middle portion in the curvature direction on the display surface. Accordingly, the reflectance of light reflected from each of the reflection layers toward the front of the LCD device is higher in the both edge portions in the curvature direction relative to that in a middle portion in the curvature direction on the display surface, and thus variation in brightness is reduced, and display quality is improved in the curved LCD device.

A surface of each of the reflection layers may be formed with a raised and recessed profile, and the raised and recessed profile of each of the reflection layers may be formed so that the reflectance of each of the reflection layers is higher in the both edge portions in the curvature direction than in the middle portion in the curvature direction on the display surface.

With this configuration also, the raised and recessed profile of each of the reflection layers causes the reflectance at each of the reflection layers in a direction normal to the display surface to be higher in the both edge portions in the curvature direction than in the middle portion in the curvature direction on the display surface. Thus, the features and advantages of the present invention are specifically achieved.

A display area formed by the plurality of pixels may include a first region, provided in the middle portion in the curvature direction on the display surface, where a reflectance of each of the reflection layers is a first reflectance, second regions, respectively provided on both sides of the first region, where a reflectance of each of the reflection layers is a second reflectance which is higher than the first reflectance, and third regions, respectively provided on opposite sides of the respective second regions from the first region, where a reflectance of each of the reflection layers is a third reflectance which is higher than the second reflectance.

With this configuration, the reflectance of light in each of the reflection layers in a direction normal to the display surface increases in a stepwise fashion along the directions from the middle portion in the curvature direction to the both edge portions in the curvature direction on the display surface. Thus, variation in brightness is effectively reduced in the curved LCD device.

Each of the pixels may include a reflection region in which the reflection layer is provided and a transmission region in which the reflection layer is not provided.

With this configuration, the features and advantages of the present invention are specifically achieved in a transflective LCD device in which each of the pixels includes a reflection region and a transmission region.

The raised and recessed profile of each of the reflection layers may be formed so that the reflectance toward a peripheral side of the display surface is lower than the reflectance toward a front side of the display surface.

With this configuration, the raised and recessed profile of each of the reflection layers causes the reflectance toward a peripheral side of the display surface to be lower than the reflectance toward a front side of the display surface. Thus, image displays are hardly visible from a peripheral side of the display surface. Accordingly, intentional reduction in the visibility in peripheral sides of the display surface so that image displays are only visible to a user in front can prevent the image displays from being viewed by others.

Advantages of the Invention

According to the present invention, the reflection layer provided in each of the pixels is formed so that the reflectance of light reflected from each of the reflection layers in the direction normal to the display surface is higher in the both edge portions in the curvature direction than in the middle portion in the curvature direction on the display surface. Thus, variation in brightness is reduced, and display quality is improved in curved LCD devices.

DESCRIPTION OF EMBODIMENTS

Example embodiments of the present invention will be described below in detail with reference to the drawings. Note that the present invention is not limited to the embodiments described hereinafter.

First Embodiment

Figure 1:
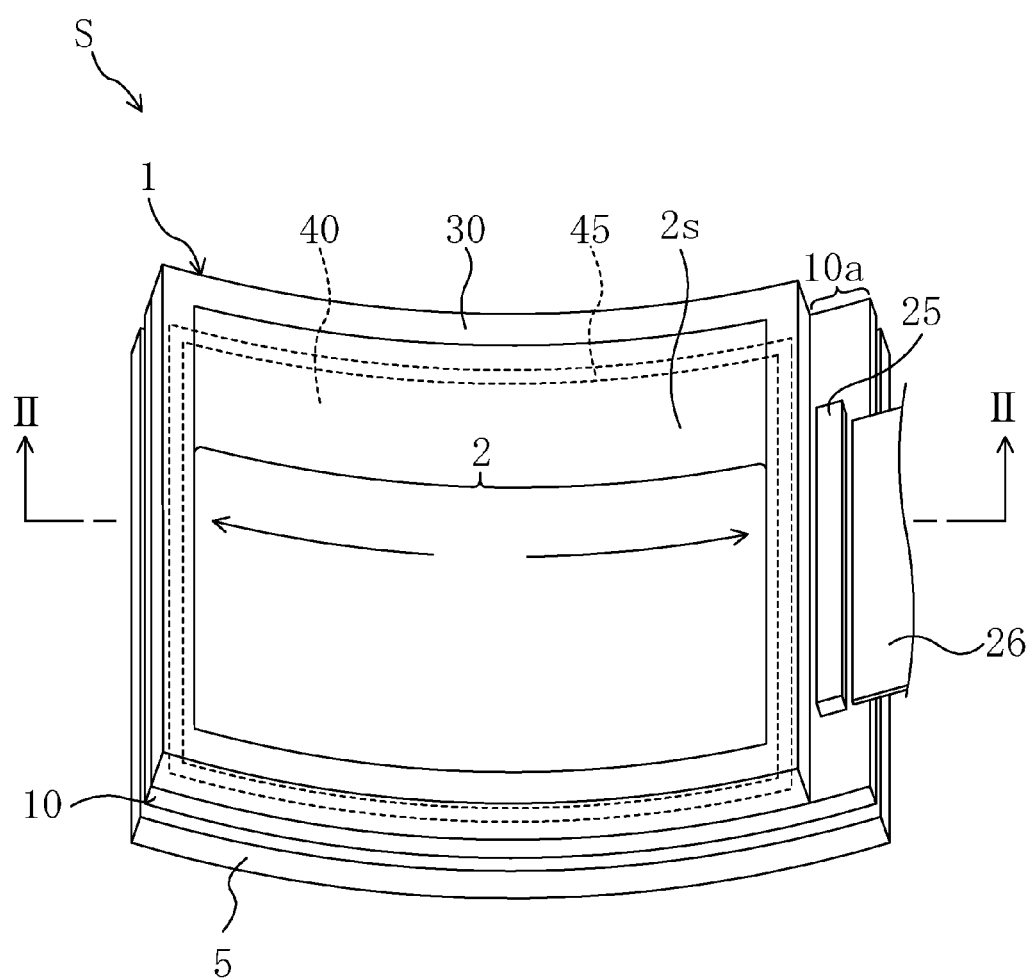
FIG. 1 is a perspective view schematically illustrating an LCD device according to the first embodiment.
Figure 2:
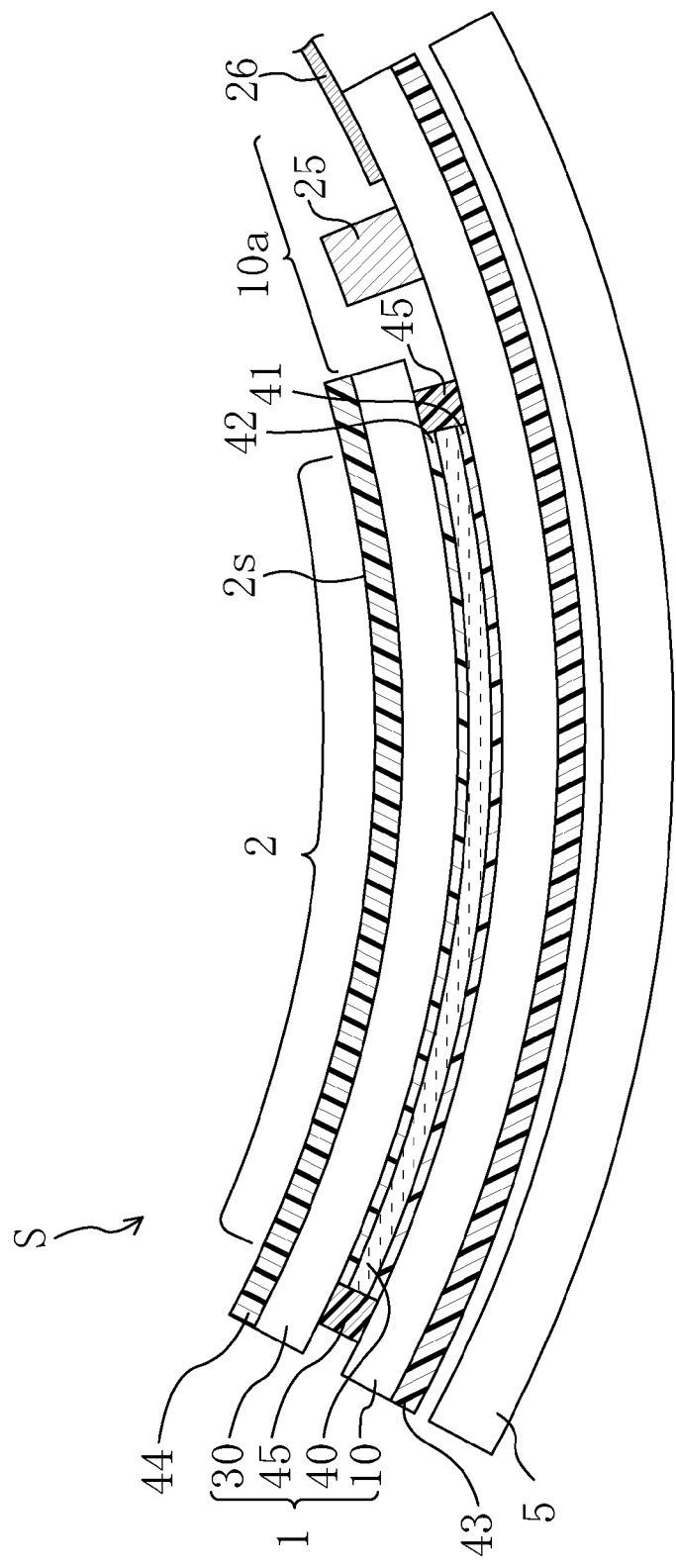
FIG. 2 is a cross-sectional view schematically illustrating the LCD device, taken along line II-II of FIG. 1.
Figure 3:
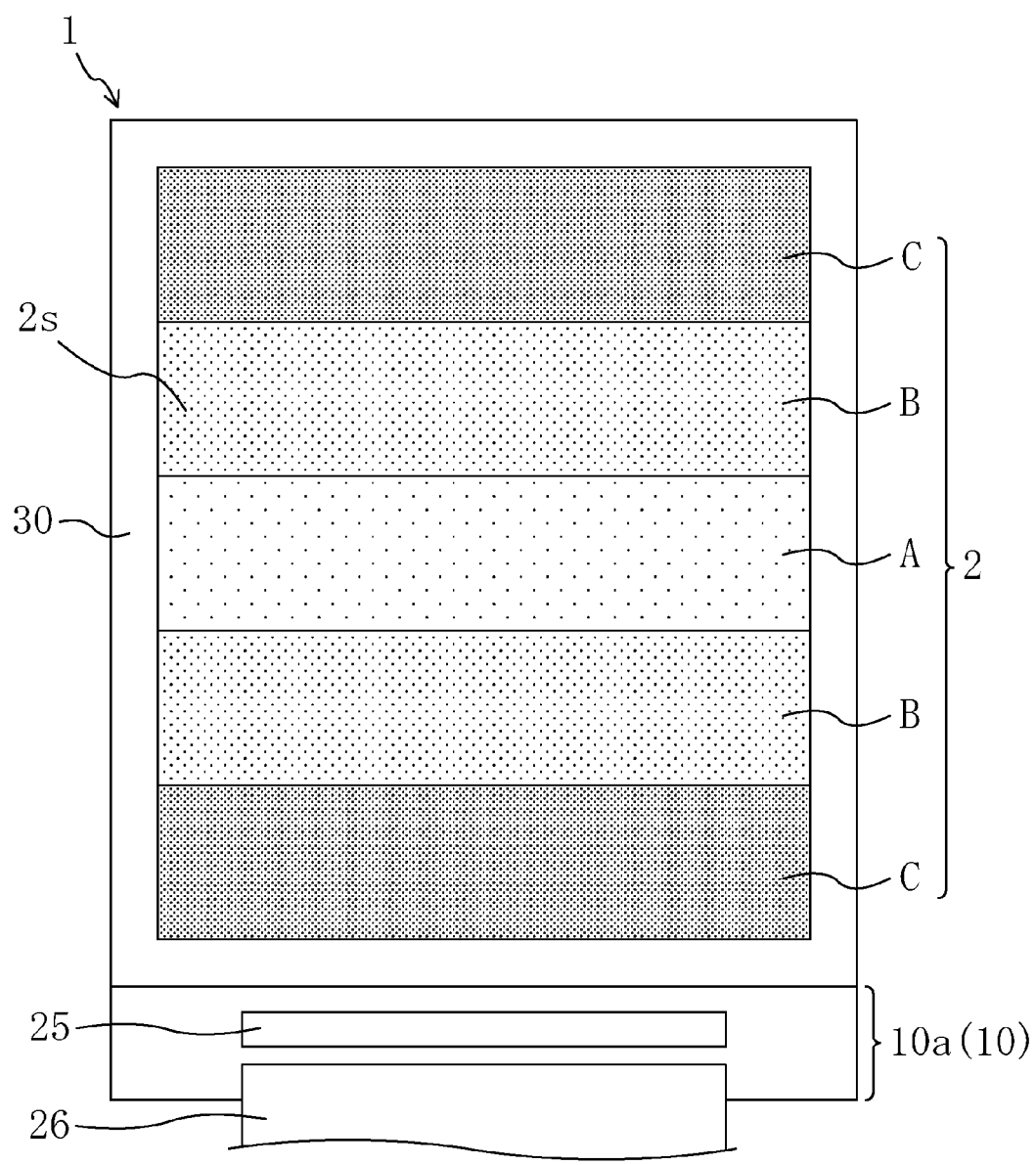
FIG. 3 is a plan view schematically illustrating a display area of the LCD panel.
Figure 4:
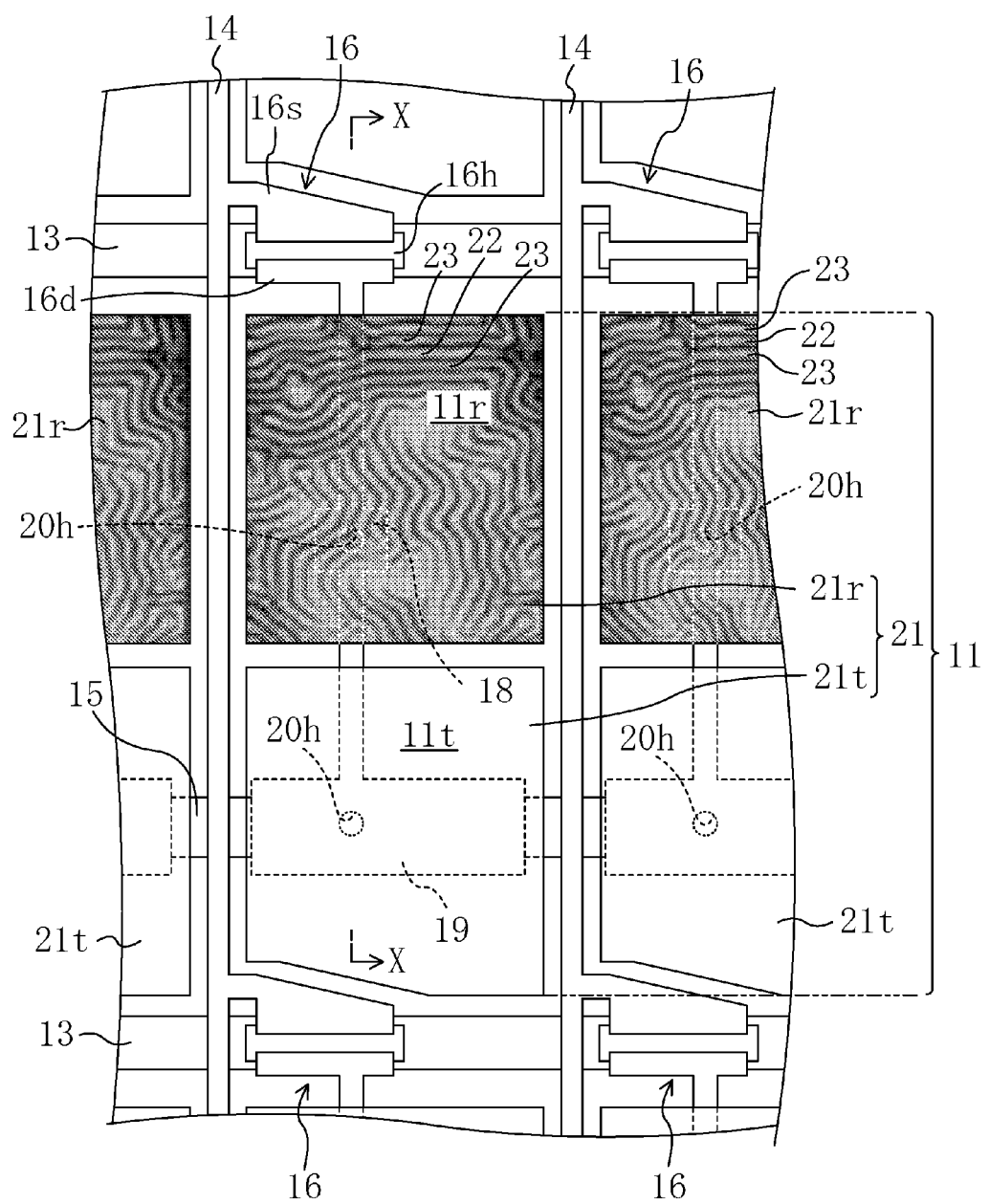
FIG. 4 is a plan view schematically illustrating a part of the thin film transistor (hereinafter referred to as "TFT") substrate of the first embodiment.
Figure 5:
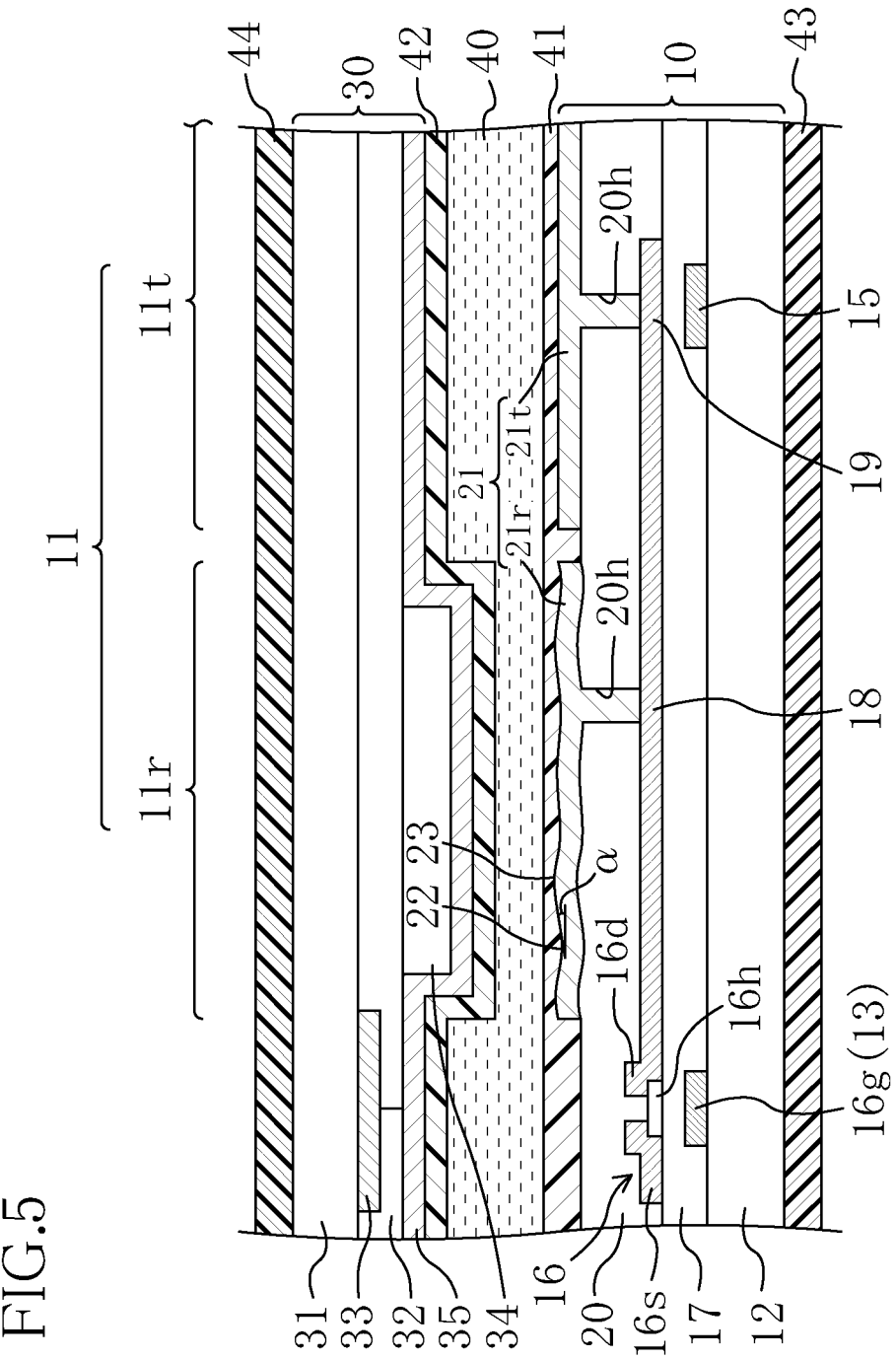
FIG. 5 is a cross-sectional view of a part corresponding to locations along line X-X of FIG. 4 in a first region of the first embodiment.
Figure 6:
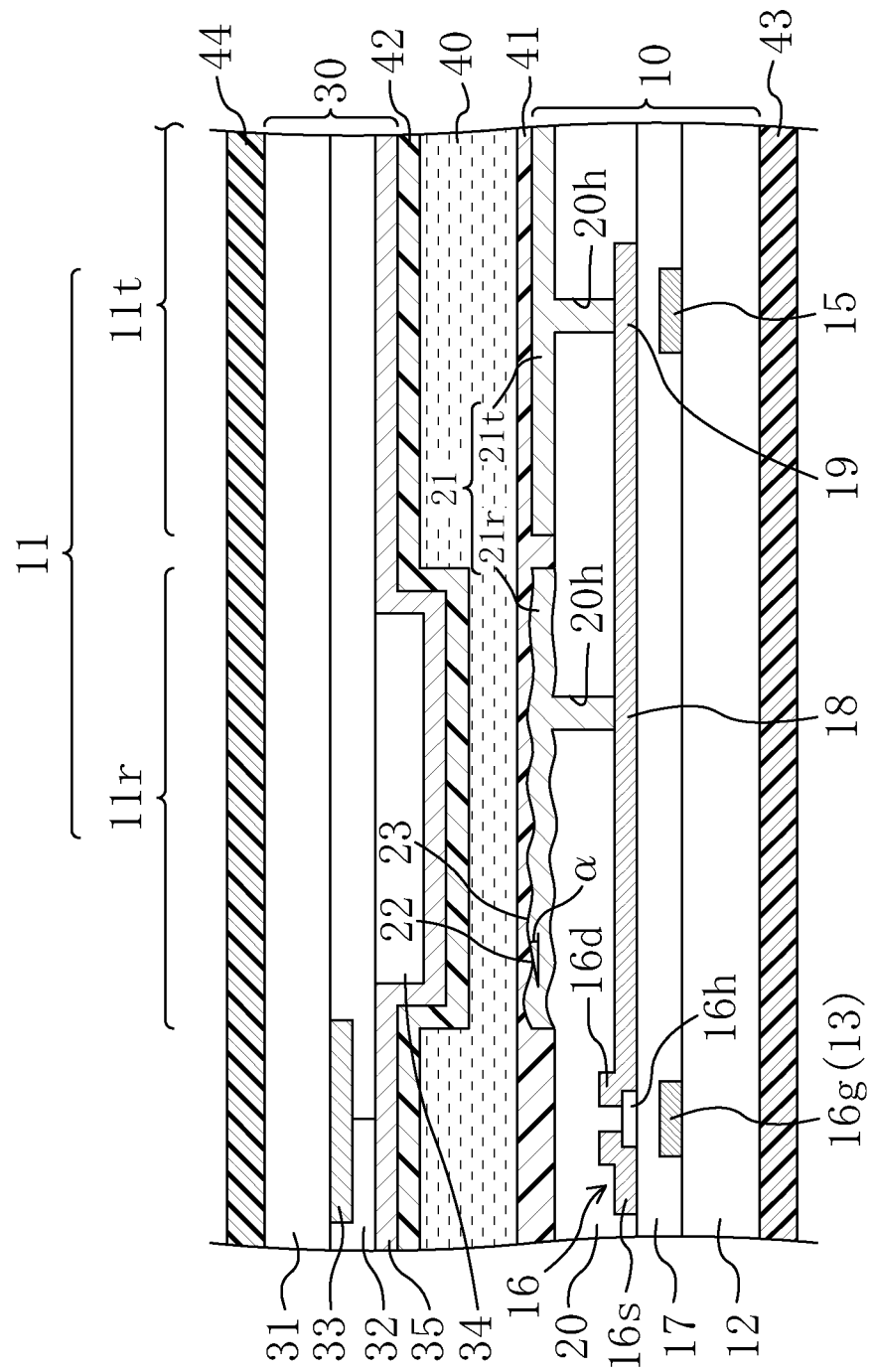
FIG. 6 is a cross-sectional view of a part corresponding to locations along line X-X of FIG. 4 in a second region of the first embodiment.
Figure 7:
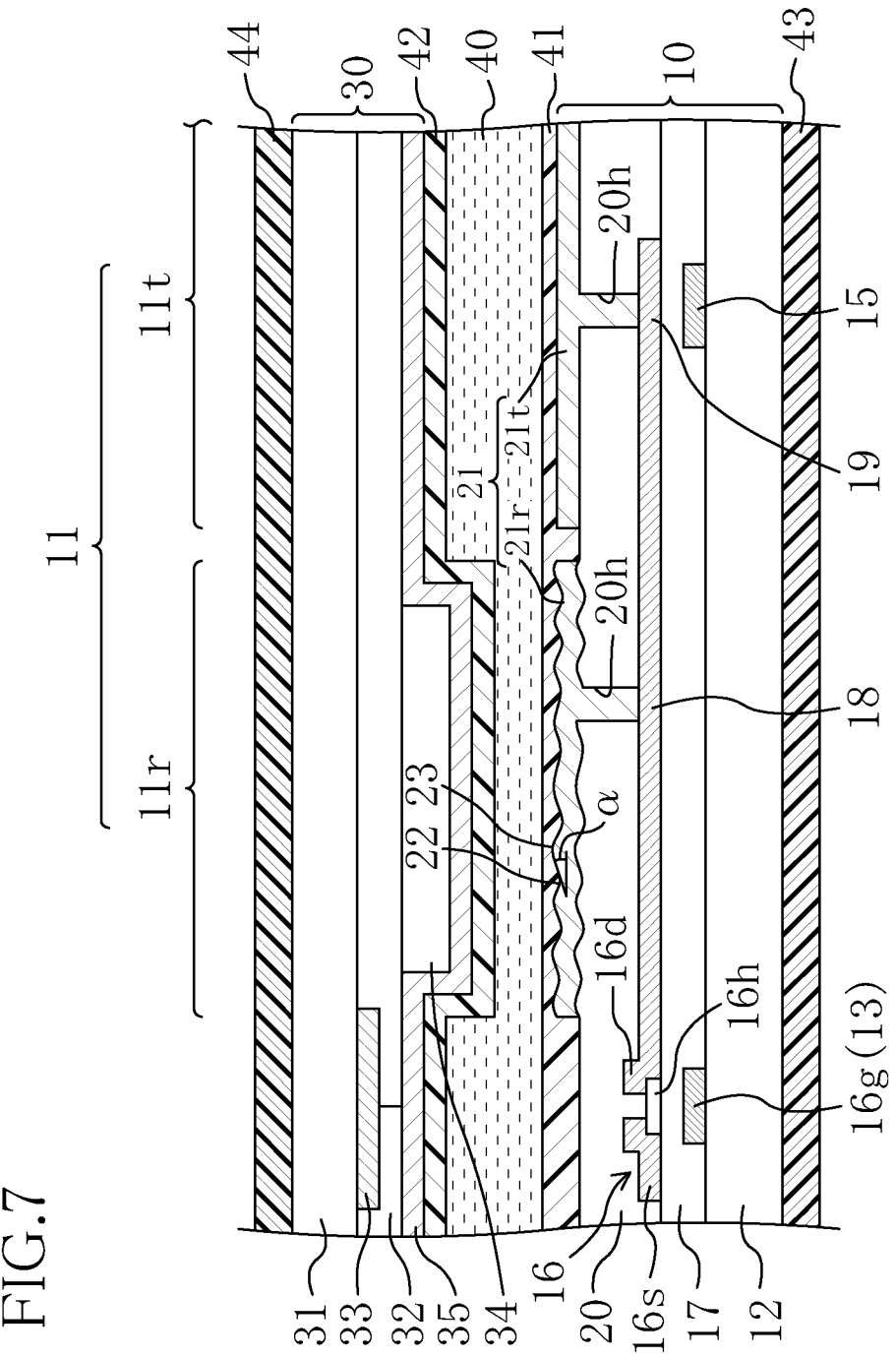
FIG. 7 is a cross-sectional view of a part corresponding to locations along line X-X of FIG. 4 in a third region of the first embodiment.

FIGS. 1 to 7 illustrate the first embodiment of the present invention. FIG. 1 is a perspective view schematically illustrating an LCD device S according to this embodiment. FIG. 2 is a cross-sectional view schematically illustrating the LCD device S, taken along line II-II of FIG. 1. FIG. 3 is a plan view schematically illustrating a display area 2 of an LCD panel 1. FIG. 4 is a plan view schematically illustrating a part of a TFT substrate 10. FIGS. 5 to 7 are cross-sectional views of parts corresponding to locations along line X-X of FIG. 4 in respective regions A, B, and C of the display area 2. Note that polarizing plates 43 and 44 are not shown in FIG. 1.

As shown in FIGS. 1 and 2, the LCD device S includes the LCD panel 1 and a backlight unit 5 disposed on the back side (lower side in FIG. 2) of the LCD panel 1.

The LCD panel 1 includes the TFT substrate 10, which is a first substrate, disposed on the backlight unit 5 side, and a color filter substrate 30, which is a second substrate, both of which are bonded together so as to face each other across a liquid crystal layer 40. In the LCD panel 1, the display area 2 is defined in an area where the TFT substrate 10 and the color filter substrate 30 face each other across the liquid crystal layer 40. The LCD panel 1 has a display surface 2s for displaying images on a surface on the color filter substrate 30 side in the display area 2.

Each of the substrates 10 and 30 included in the LCD panel 1 has flexibility, and the LCD panel 1 is fixed under transformation into a curved shape as a whole. Specifically, as shown in FIGS. 1 and 2, the LCD panel 1 is curved in one direction (downward direction in the figures) throughout the long side direction (lateral direction in the figures) so that the display surface 2s forms a concave curved surface. The display surface 2s has a curvature of, for example, approximately 1/500 to 1/50(1/mm) The arrows in FIG. 1 indicate the curvature direction of the LCD panel 1 (the display surface 2s). Here, the term "curvature direction" means the direction along the curvature of the LCD panel 1.

Although this embodiment assumes that the LCD panel 1 is curved in the long side direction, the LCD panel 1 may be curved in a short side direction (longitudinal direction in FIG. 1). In addition, the LCD panel 1 is not limited to the one described above, but a rectangular display surface 2s may be configured to curve in an oblique direction.

The TFT substrate 10 and the color filter substrate 30 are formed in, for example, a rectangular shape etc., and as shown in FIG. 2, alignment films 41 and 42 are respectively provided on surfaces on the liquid crystal layer 40 side, and polarizing plates 43 and 44 are respectively provided on surfaces opposite the liquid crystal layer 40. A sealing member 45, having a frame structure, made of epoxy resin etc. is provided between the TFT substrate 10 and the color filter substrate 30 so as to surround the display area 2, and sealing in liquid crystal material within the space surrounded by the sealing member 45 forms the liquid crystal layer 40.

As shown in FIG. 4, the TFT substrate 10 includes a plurality of pixels 11 defined in a matrix, which form the display area 2. The LCD device S of this embodiment is a transflective LCD device, and thus each of the pixels 11 includes a reflection region 11r which reflects external light incident from the color filter substrate 30 side, and a transmission region 11t which transmits light from the backlight unit 5. For example, the reflection region 11r is disposed in an upper portion column-wise (longitudinal direction in FIG. 4) in each of the pixels 11, and the transmission region 11t is disposed in an underside of the reflection region 11r column-wise in each of the pixels 11.

The TFT substrate 10 has a thin glass substrate 12 shown in FIG. 5. On the glass substrate 12, as shown in FIG. 4, a plurality of gate bus lines 13 are provided so as to extend row-wise (in the lateral direction in the figure) with respect to the pixels 11 in parallel with each other, a plurality of source bus lines 14 are provided so as to extend, in parallel with each other, in a perpendicular direction to each of the gate bus lines 13, and storage capacitor bus lines 15 are provided in lower portions column-wise (in the longitudinal direction in the figure) of the respective pixels 11 so as to extend between respective pairs of the gate bus lines 13. The gate bus lines 13 and the source bus lines 14 define the pixels 11, and TFTs 16, connected to both the gate bus lines 13 and the source bus lines 14 which form intersections, are respectively provided near the intersections of the gate bus lines 13 and source bus lines 14.

As shown in FIG. 5, each of the TFTs 16 includes a gate electrode 16g, provided on the glass substrate 12, and including a part of a gate bus line 13, a semiconductor layer 16h, provided so as to overlap the gate electrode 16g across a gate insulating film 17 provided over nearly the entire surface of the glass substrate 12 so as to cover the gate electrode 16g, a source electrode 16s, connected to an end portion of the semiconductor layer 16h and connected to a source bus line 14, and a drain electrode 16d, connected to the other end portion of the semiconductor layer 16h. As shown in FIG. 4, a terminal layer 18 is provided in an upper portion column-wise of each of the pixels 11, and a storage capacitor electrode 19 is provided in a lower portion column-wise of each of the pixels 11 so as to overlap a storage capacitor bus line 15, both in a monolithic fashion with the drain electrode 16d of the TFT 16 in each of the pixels 11, over the gate insulating film 17.

In addition, as shown in FIG. 5, an insulating film 20 is provided in the TFT substrate 10 so as to cover the source bus lines 14, the TFTs 16, the terminal layers 18, and the storage capacitor electrodes 19. A pixel electrode 21 is provided for each of the pixels 11 on the insulating film 20.

As shown in FIG. 4, contact holes 20h are provided in the insulating film 20 respectively over a terminal layer 18 and a storage capacitor electrode 19. As shown in FIGS. 5 to 7, the surface of the reflection region 11r of each of the pixels 11 of the insulating film 20 is formed with a raised and recessed profile, and this raised and recessed profile is, for example, a crease-like profile in which recessed portions and raised portions extend in a random manner.

As shown in FIG. 4, each of the pixel electrodes 21 includes a reflective electrode 21r, which is provided in the reflection region 11r, and which is a reflection layer formed of metal material having a high reflectance such as Al or Ag, and a transparent electrode 21t, which is provided in the transmission region 11t, and formed of metal material having a high transmittance such as indium tin oxide (ITO). In each of the pixels 11, the reflective electrode 21r and the transparent electrode 21t are spaced apart from each other. The reflective electrode 21r is connected to the terminal layer 18 through a contact hole 20h, and the transparent electrode 21t is connected to the storage capacitor electrode 19 through a contact hole 20h.

As shown in FIG. 4, the surface of each of the reflective electrodes 21r is formed with a crease-like, raised and recessed profile where recessed portions 22 and raised portions 23 extend in a random manner, reflecting the raised and recessed profile of the insulating film 20. Thus, the surface of each of the reflective electrode 21r scatters light incident from the surroundings, and reflects the light toward the front of the LCD device S. In addition, the raised and recessed profile of each of the reflective electrodes 21r is formed so that the reflectance of light reflected from each of the reflective electrodes 21r in the direction normal to the display surface 2s is higher in both edge portions in the curvature direction than in a middle portion in the curvature direction on the display surface 2s.

As shown in FIG. 3, the display area 2 has a plurality of elongated regions (first through third regions A to C) whose reflectances of light in the direction normal to the display surface 2s in each of the reflective electrodes 21r differ from each other along the directions from a middle portion in the curvature direction (longitudinal direction in the figure) to both edge portions in the curvature direction on the display surface 2s, and the elongated regions are arranged in parallel. Specifically, the display area 2 includes a first region A, which is provided in a middle portion in the curvature direction of the display surface 2s, and in which a reflectance of light in the direction normal to the display surface 2s in each of the reflective electrodes 21r is greater than 0% and less than 5%, second regions B, which are respectively provided on both sides of the first region A, and in which a reflectance of light in the direction normal to the display surface 2s in each of the reflective electrodes 21r is equal to or greater than 5% and less than 10%, and third regions C, which are respectively provided on opposite sides of the respective second regions B from the first region A, and in which a reflectance of light in the direction normal to the display surface 2s in each of the reflective electrodes 21r is equal to or greater than 10% and less than 15%.

The reflectances of light in the direction normal to the display surface 2s in each of the reflective electrodes 21r in the plurality of elongated regions A to C arranged in parallel increase in a stepwise fashion along the directions from the middle portion to the both edge portions in the curvature direction on the display surface 2s by adjusting, in each of the elongated regions A to C, the distribution range of slope angle α and the level of average slope angle of the raised and recessed profile in each of the reflective electrodes 21r by the surface conditions of the insulating film 20.

The raised and recessed profile of each of the reflective electrodes 21r in the first through third regions A to C of this embodiment is formed with the distribution range of slope angle α being adjusted so that the average slope angle increases along the directions from the middle portion in the curvature direction to the both edge portions in the curvature direction on the display surface 2s. Here, as shown in FIGS. 5 to 7, the phrase "slope angle α of the raised and recessed profile in a reflective electrode 21r" means the slope angle between the bottom of a recessed portion 22 and the top of a raised portion 23 adjacent to each other, that is, an angle contained by the line connecting the bottom of a recessed portion 22 and the top of a raised portion 23 adjacent to each other and a plane parallel to the surface of the glass substrate 12, in the raised portion 23. The term "average slope angle" means the arithmetic average of all the values of slope angle α between the bottoms of the recessed portions 22 and the tops of the raised portions 23 adjacent to each other in the reflective electrodes 21r.

In this embodiment, the raised and recessed profile in each of the reflective electrodes 21r in the first region A is a relatively gradually raised and recessed profile as shown in FIG. 5. For example, the slope angle α lies in a range between 1.0 and 4.0°, and the average slope angle is approximately 2.5°. The raised and recessed profile in each of the reflective electrodes 21r in each of the second regions B is more steeply raised and recessed than the raised and recessed profile in each of the reflective electrodes 21r in the first region A as shown in FIG. 6. For example, the slope angle α lies in a range between 4.0 and 7.0°, and the average slope angle is approximately 5.5°. The raised and recessed profile in each of the reflective electrodes 21r in each of the third regions C is even more steeply raised and recessed than the raised and recessed profile in each of the reflective electrodes 21r in each of the second regions B as shown in FIG. 7. For example, the slope angle α lies in a range between 7.0 and 10.0°, and the average slope angle is approximately 8.5°.

In addition, as shown in FIGS. 1 and 2, the TFT substrate 10 is longer in the long side direction of the LCD panel 1, and has a larger area, than the color filter substrate 30; and has a mounting portion 10a protruding externally of the color filter substrate 30. In the mounting portion 10a, an integrated circuit chip 25 for driving the TFT etc., a flexible printed wiring board 26 for supplying power to the integrated circuit chip 25 and for supplying a signal from an external circuit to the LCD panel 1, etc. are mounted.

As shown in FIG. 5, the color filter substrate 30 includes a glass substrate 31. A plurality of color filters 32 are provided over the glass substrate 31 so as to overlap the pixel electrodes 21. A black matrix 33 is provided so as to define each of the color filters 32. A transparent layer 34 is provided in the color filter substrate 30 so as to overlap the reflection region 11r of each of the pixels 11 in order to reduce the thickness of the liquid crystal layer 40 over each of the reflection regions 11r to a thickness less than the thickness of the liquid crystal layer 40 over each of the transmission regions 11t. Thus, the thickness of the liquid crystal layer 40 over each of the reflection regions 11r is reduced to approximately half of the thickness of the liquid crystal layer 40 over each of the transmission regions lit so that the optical path lengths of light passing through the liquid crystal layer 40 over a reflection region 11r and over a transmission region lit are almost the same, thereby improving display quality. In addition, in the color filter substrate 30, a common electrode 35 is provided so as to cover the transparent layers 34 and the color filters 32.

Although not shown, the backlight unit 5 includes a light source such as a fluorescent lamp (cold cathode fluorescent tube) or a light emitting diode (LED), a light guide plate, and a plurality of optical sheets such as prism sheets. The light guide plate and the optical sheets are made of resin, and have flexibility. As shown in FIGS. 1 and 2, the backlight unit 5 is fixed under transformation into a curved shape as a whole along the LCD panel 1, and is configured so as to emit light incident from the light source onto the light guide plate, from an emitting surface of the light guide plate through the optical sheets to the LCD panel 1 side, as uniform plane light.

Thus, the transflective LCD device S applies a voltage across each of the pixel electrodes 21 and the common electrode 35, and controls the orientation of liquid crystal molecules on each of the pixels 11 while, in each of the pixels 11, the reflection region 11r reflects external light and the transmission region 11t transmits light from the backlight unit 5, so as to display images as desired on the display surface 2s (display area 2).

Manufacturing Method

Next, a manufacturing method of the LCD device S described above will be described.

First, the two glass substrates 12 and 31 are prepared. Next, the bus lines 13, 14, and 15, the TFTs 16, the terminal layers 18, and the storage capacitor electrodes 19 are formed on the glass substrate 12. Then, positive photosensitive resin is applied and a film thereof is formed on the glass substrate 12 using a spin coater etc., and prebaking at a temperature about 110° C. for two minutes, an exposure treatment using a mask, and development are sequentially conducted on the photosensitive resin film to form the contact holes 20h.

Next, the photosensitive resin film in which the contact holes 20h are formed is postbaked at a temperature about 135° C. for about eight minutes, and thereafter, ultraviolet light is sequentially radiated using a mask onto regions, of the photosensitive resin film, which will be the reflection regions 11r of the elongated regions A to C with irradiation energies suitable for the raised and recessed profiles of the insulating film 20 formed in the respective regions. That is, on the photosensitive resin film, ultraviolet light is respectively radiated onto a region which will be the first region A with a relatively low irradiation energy, onto regions which will be the second regions B with a higher irradiation energy than the irradiation energy for the region which will be the first region A, and onto regions which will be the third regions C with an even higher irradiation energy than the irradiation energy for the regions which will be the second regions B. Then, final baking on the photosensitive resin film at a temperature about 210° C. for about 60 minutes yields, on a surface of the photosensitive resin film, a crease-like, raised and recessed profile having different distribution ranges of slope angle α and different levels of average slope angle between the regions which will be the elongated regions A to C. Thus, the insulating film 20 having a surface with a predetermined raised and recessed profile in each of the regions which will be the elongated regions A to C is formed.

Thereafter, the reflective electrodes 21r are respectively formed in regions, of the insulating film 20, which will be the respective reflection regions 11r. In doing so, the surface of each of the reflective electrodes 21r is formed with a raised and recessed profile, reflecting the raised and recessed profile of the insulating film 20. In addition, respectively forming the transparent electrodes 21t in regions of the insulating film 20 which will be the respective transmission regions 11t produces the TFT substrate 10. Then, the alignment film 41 is formed over the TFT substrate 10 by a printing method etc.

Moreover, forming the black matrix 33, the color filters 32, the transparent layers 34, and the common electrode 35 on and over the other glass substrate 31 produces the color filter substrate 30. Then, the alignment film 42 is formed on the surface of the color filter substrate 30 by a printing method. Next, the sealing member 45 is formed in a frame structure on the TFT substrate 10 by drawing using a dispenser etc. or by a printing method. Thereafter, a predetermined amount of liquid crystal material is dropped into a region, on the TFT substrate 10, surrounded by the sealing member 45. Subsequently, in the processing chamber under vacuum, the TFT substrate 10 and the color filter substrate 30 are aligned so that the respective pixel electrodes 21 and the respective color filters 32 overlap, and the both substrates 10 and 30 are bonded together with the sealing member 45 therebetween. Then, the sealing member 45 is cured to make the both substrates 10 and 30 adhere with respect to each other. Thus, the LCD panel 1 is produced.

Although, in this embodiment, the manufacturing process of the LCD panel 1 has been described using an example of so-called "one drop filling" in which the material of the sealing member 45 is supplied onto the TFT substrate 10 in a frame structure, and liquid crystal material is dropped into the space surrounded by the sealing member 45, and then the TFT substrate 10 and the color filter substrate 30 are bonded together, the LCD panel may be manufactured by so-called "vacuum injection method" in which the material of the sealing member is applied to the TFT substrate 10 to form the sealing member almost in a frame structure having incision, the TFT substrate 10 and the color filter substrate 30 are bonded together with the sealing member therebetween, and then, the liquid crystal material is injected under vacuum through an injection hole configured by the incision in the sealing member, before sealing the injection hole.

Thereafter, the polarizing plates 43 and 44 are bonded to the respective surfaces of the LCD panel 1, and the integrated circuit chip 25 and the flexible printed wiring board 26 are each mounted on the mounting portion 10a of the TFT substrate 10. Then, the previously prepared backlight unit 5 is attached on the backside of the LCD panel 1, and the LCD panel 1 and the backlight unit 5 are transformed and fixed so that the display surface 2s forms a concave curved surface. Thus, the LCD device S shown in FIG. 1 is completed.

Advantages of First Embodiment

Thus, according to the first embodiment, the raised and recessed profile in each of the reflective electrodes 21r is formed such that the reflectance of light reflected from each of the reflective electrodes 21r in the direction normal to the display surface 2s is higher in the both edge portions in the curvature direction than in the middle portion in the curvature direction on the display surface 2s. Accordingly, the reflectance of light reflected from each of the reflective electrodes 21r toward the front of the LCD device S can be higher in both the edge portions in the curvature direction than in the middle portion in the curvature direction on the display surface 2s, and thus, variation in brightness is reduced, and display quality is improved in the curved LCD device S.

Moreover, since the display area 2 includes the first through third regions A to C, the reflectance of light in the direction normal to the display surface 2s in each of the reflective electrodes 21r increases in a stepwise fashion along the directions from the middle portion to the both edge portions in the curvature direction on the display surface 2s. Thus, variation in brightness can be effectively reduced in the curved LCD device S.

Second Embodiment

Figure 8:
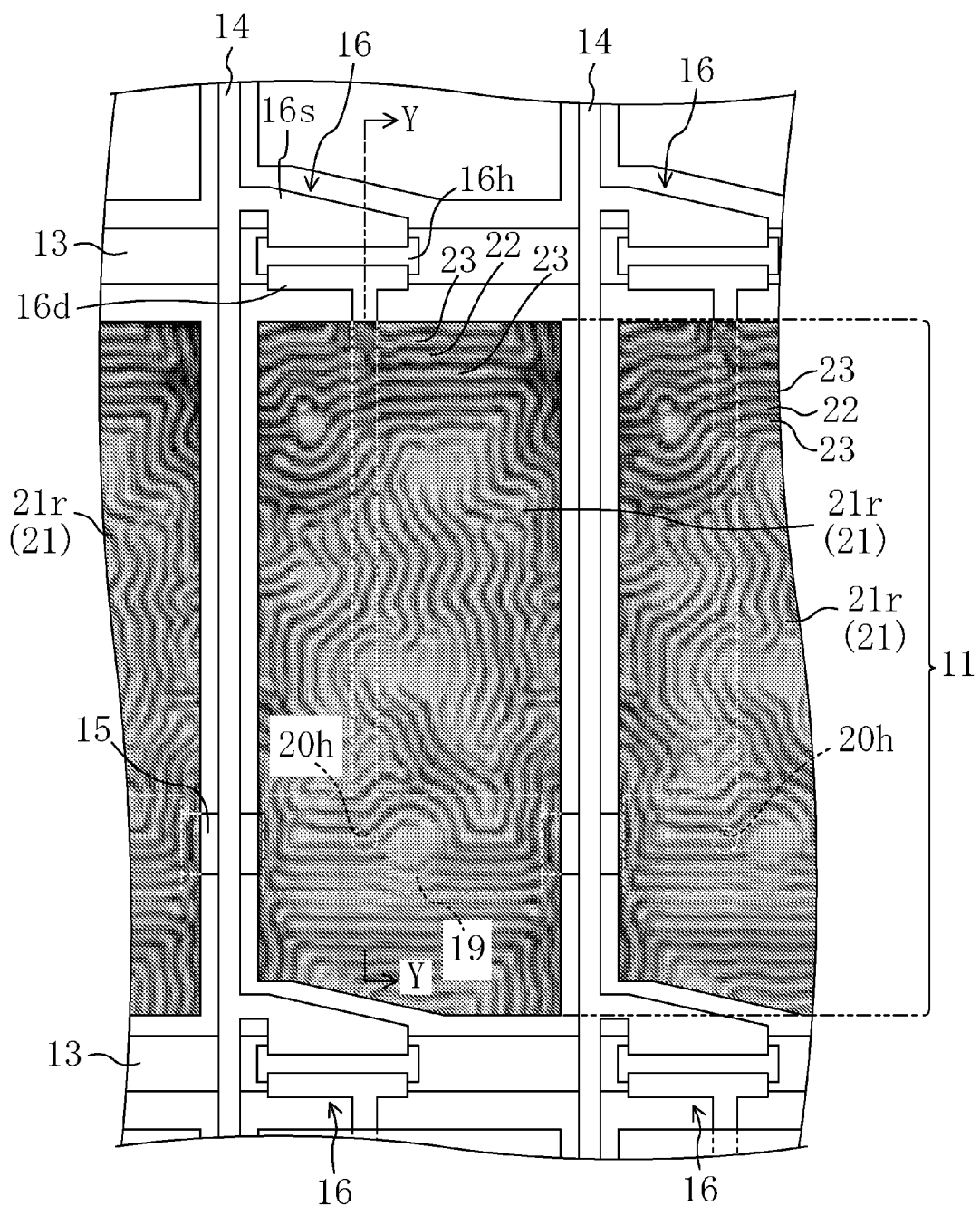
FIG. 8 is a plan view schematically illustrating a part of the TFT substrate of the second embodiment.
Figure 9:
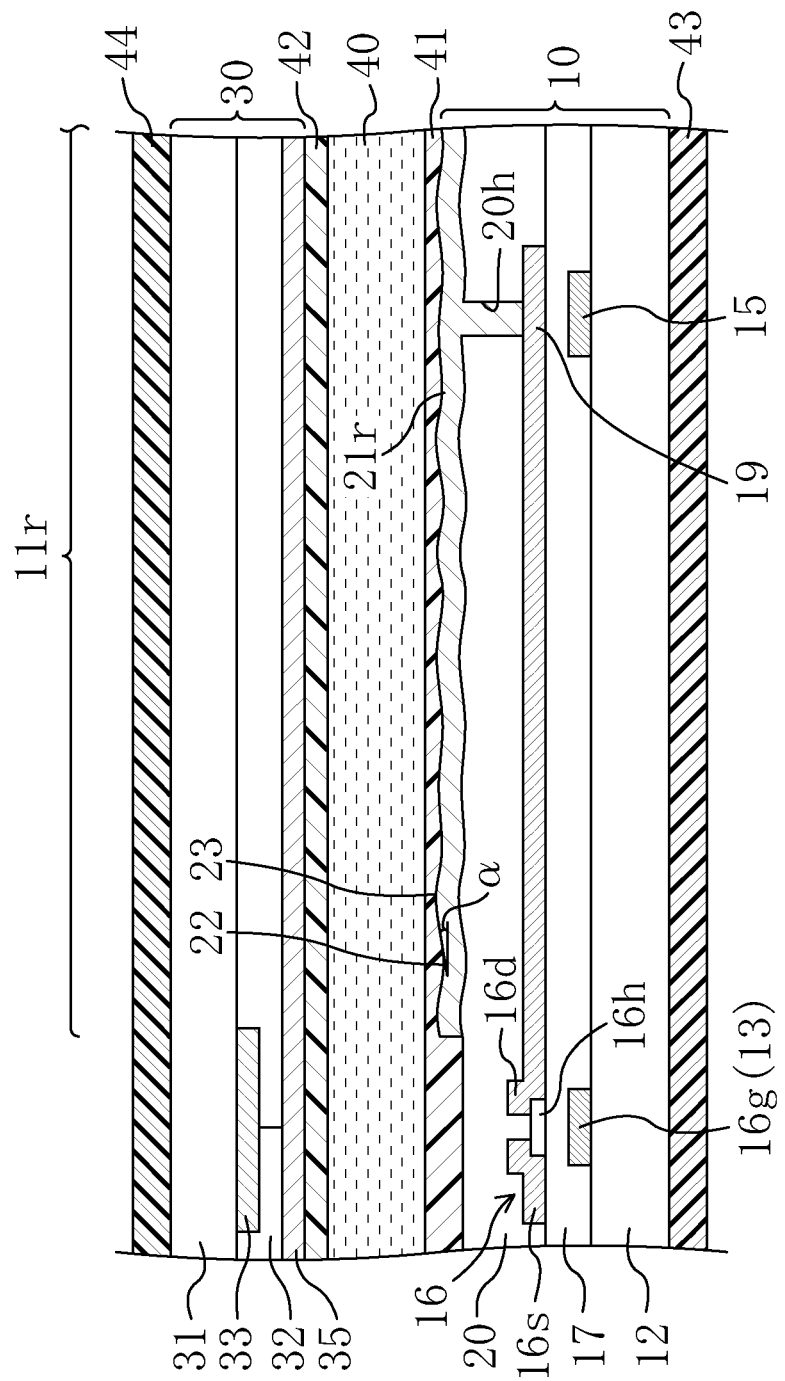
FIG. 9 is a cross-sectional view of a part corresponding to locations along line Y-Y of FIG. 8 in a first region of the second embodiment.
Figure 10:
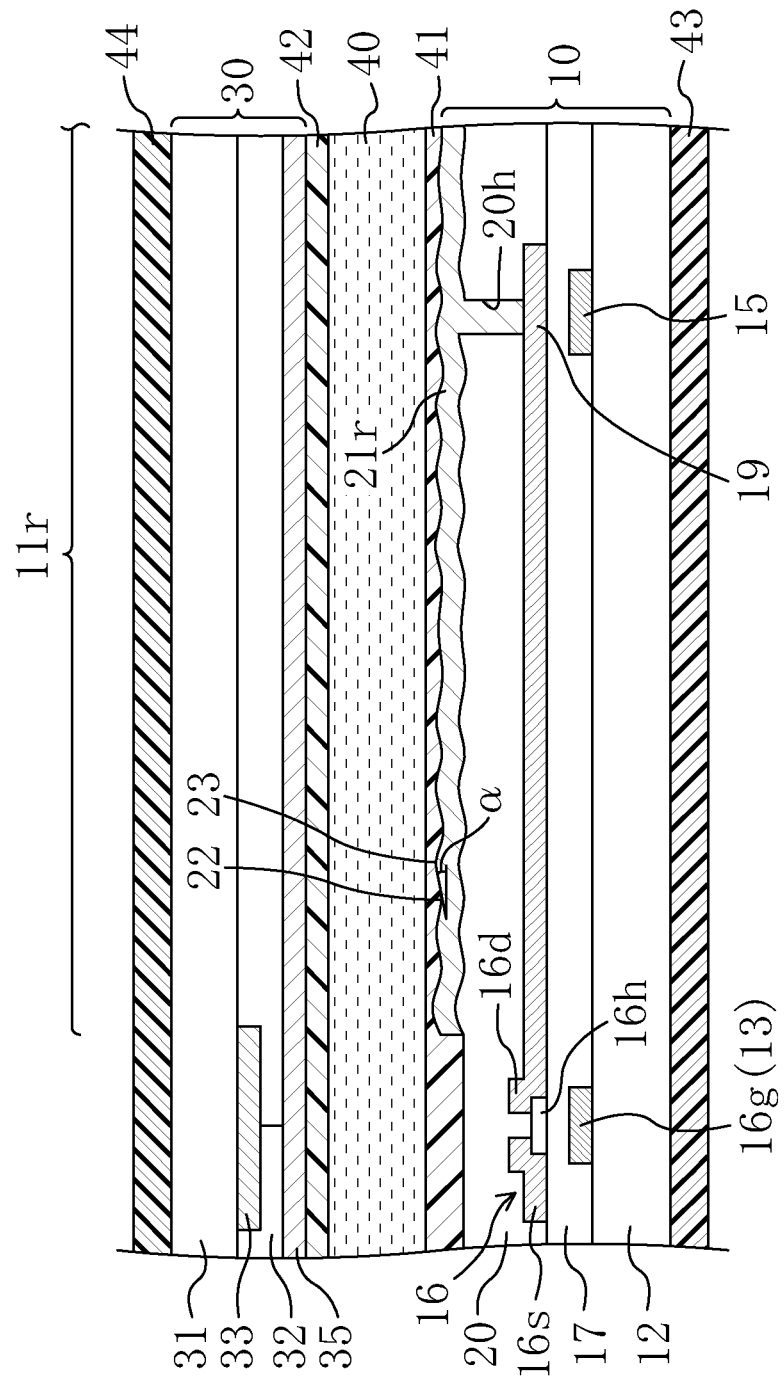
FIG. 10 is a cross-sectional view of a part corresponding to locations along line Y-Y of FIG. 8 in a second region of the second embodiment.
Figure 11:
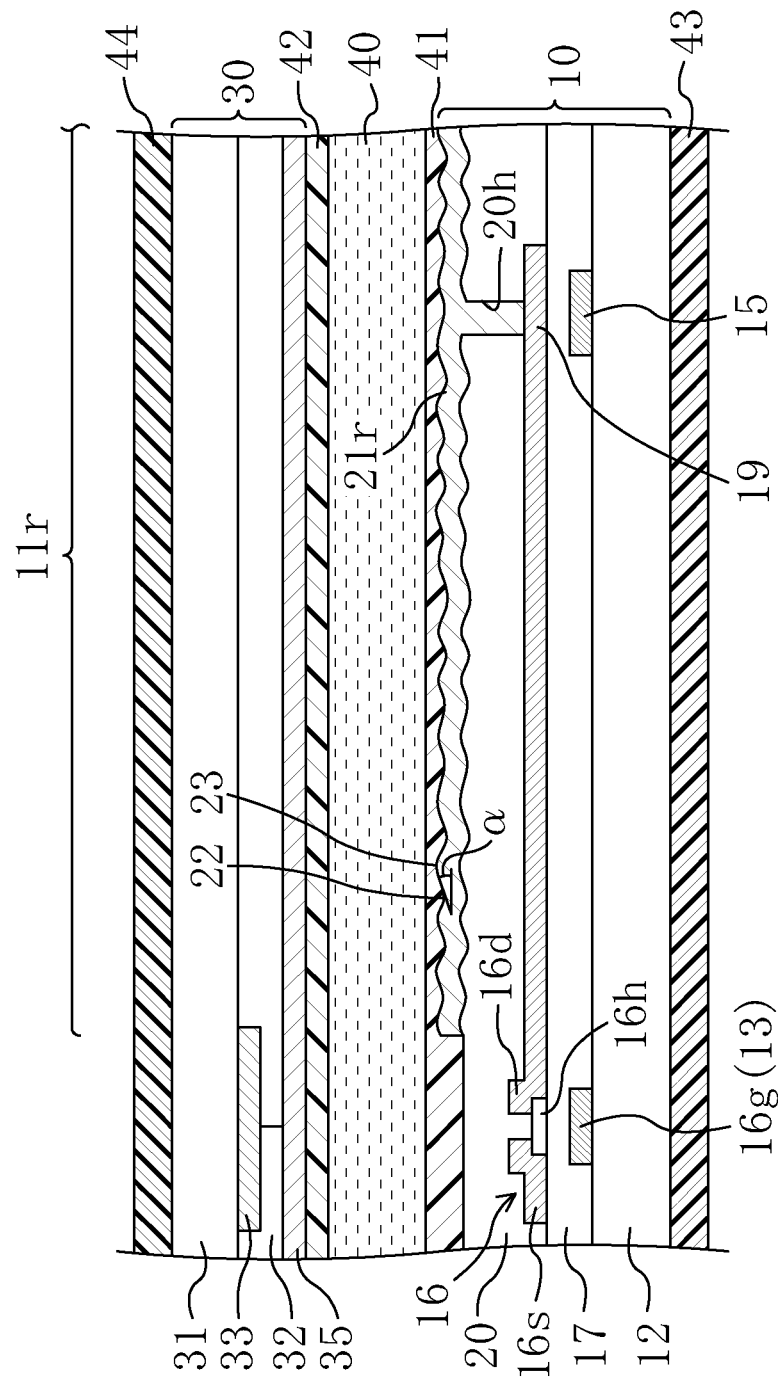
FIG. 11 is a cross-sectional view of a part corresponding to locations along line Y-Y of FIG. 8 in a third region of the second embodiment.

FIGS. 8 to 11 illustrate the second embodiment of the present invention. In the embodiments hereafter, the same reference numerals are used to represent equivalent elements to those shown in FIGS. 1 to 7, and the detailed explanation thereof will be omitted. FIG. 8 is a plan view schematically illustrating a part of the TFT substrate 10 of this embodiment. FIGS. 9 to 11 are cross-sectional views of parts corresponding to locations along line Y-Y of FIG. 8 in the respective regions A, B, and C of the display area 2.

While the first embodiment described above has been presented in terms of the transflective LCD device S, this embodiment is presented in terms of a reflective LCD device S.

As shown in FIG. 8, the LCD device S according to this embodiment includes pixel electrodes 21 each having a reflective electrode 21r. Each of the reflective electrodes 21r is connected through a contact hole 20h to the storage capacitor electrode 19, which is formed in a monolithic fashion with the drain electrode 16d of the TFT 16 with respect to each of the pixels 11. As with the first embodiment described above, the LCD panel 1 of this embodiment also has the display surface 2s which is curved to form a concave curved surface, and the display surface 2s has a plurality of elongated regions A to C whose reflectances of light in the direction normal to the display surface 2s in each of the reflective electrodes 21r differ from each other. As shown in FIG. 8, the surface of each of the reflective electrodes 21r is formed with a crease-like, raised and recessed profile where recessed portions 22 and raised portions 23 extend in a random manner; and adjustment, in each of the elongated regions A to C, of the distribution range of slope angle α and the level of average slope angle of the raised and recessed profile in each of the reflective electrodes 21r causes the reflectance of light in the direction normal to the display surface 2s in each of the reflective electrodes 21r to increase in a stepwise fashion along the directions from the middle portion to the both edge portions in the curvature direction on the display surface 2s.

As with the first embodiment described above, the raised and recessed profile of each of the reflective electrodes 21r in the first through third regions A to C of this embodiment is also formed with the distribution range of slope angle α being adjusted so that the average slope angle increases along the directions from the middle portion in the curvature direction to the both edge portions in the curvature direction on the display surface 2s. The raised and recessed profile in each of the reflective electrodes 21r in the first region A is a relatively gradually raised and recessed profile as shown in FIG. 9. For example, the slope angle α lies in a range between 1.0 and 4.0°, and the average slope angle is approximately 2.5°. The raised and recessed profile in each of the reflective electrodes 21r in each of the second regions B is more steeply raised and recessed than the raised and recessed profile in each of the reflective electrodes 21r in the first region A as shown in FIG. 10. For example, the slope angle α lies in a range between 4.0 and 7.0°, and the average slope angle is approximately 5.5°. The raised and recessed profile in each of the reflective electrodes 21r in each of the third regions C is even more steeply raised and recessed than the raised and recessed profile in each of the reflective electrodes 21r in each of the second regions B as shown in FIG. 11. For example, the slope angle α lies in a range between 7.0 and 10.0°, and the average slope angle is approximately 8.5°.

The configuration of the other part of the LCD device S of this embodiment is similar to that of the first embodiment described above, and a front light unit is attached as necessary on the front face side (upper side in FIG. 1) of the LCD panel 1.

Advantages of Second Embodiment

Thus, also according to the second embodiment, since the display area 2 includes the first through third regions A to C, the reflectance of light in the direction normal to the display surface 2s in each of the reflective electrodes 21r increases in a stepwise fashion along the directions from the middle portion to the both edge portions in the curvature direction on the display surface 2s. Thus, similar advantages to those of the first embodiment described above can be obtained.

Third Embodiment

Figure 12:
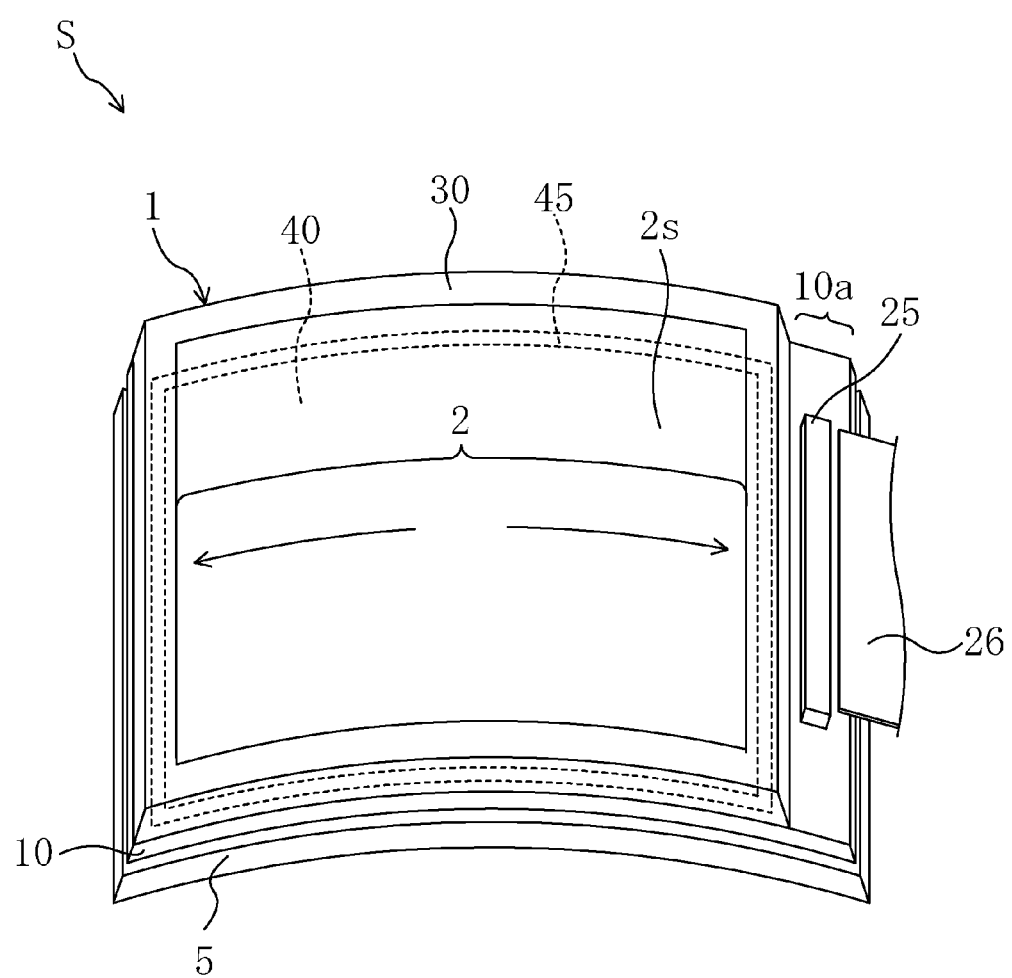
FIG. 12 is a perspective view schematically illustrating an LCD device according to the third embodiment.

FIG. 12 illustrates the third embodiment of the present invention. FIG. 12 is a perspective view schematically illustrating an LCD device S according to this embodiment.

While the first and second embodiments described above have assumed that the LCD panel 1 has the display surface 2s which is curved to form a concave curved surface, the LCD panel 1 of this embodiment is configured such that the display surface 2s is curved in the long side direction so as to form a convex curved surface as shown in FIG. 12. The arrows in FIG. 12 indicate the curvature direction of the LCD panel 1 (the display surface 2s). The backlight unit 5 is also configured to curve along the LCD panel 1.

Although this embodiment assumes that the LCD panel 1 is curved in the long side direction, the LCD panel 1 may be curved in a short side direction, and moreover, the rectangular display surface 2s may be configured to curve in an oblique direction.

Also in the LCD device S of this embodiment, as with the first embodiment described above, the surface of each of the reflective electrodes 21r is formed with a crease-like, raised and recessed profile; and adjustment, in each of the elongated regions (first through third regions) A to C, of the distribution range of slope angle α and the level of average slope angle of the raised and recessed profile in each of the reflective electrodes 21r causes the reflectance of light in the direction normal to the display surface 2s in each of the reflective electrodes 21r to increase in a stepwise fashion along the directions from the middle portion to the both edge portions in the curvature direction on the display surface 2s.

Advantages of Third Embodiment

Thus, also according to the third embodiment, since the display area 2 includes the first through third regions A to C, the reflectance of light in the direction normal to the display surface 2s in each of the reflective electrodes 21r increases in a stepwise fashion along the directions from the middle portion to the both edge portions in the curvature direction on the display surface 2s. Thus, similar advantages to those of the first embodiment described above can be obtained.

Fourth Embodiment

Figure 13:
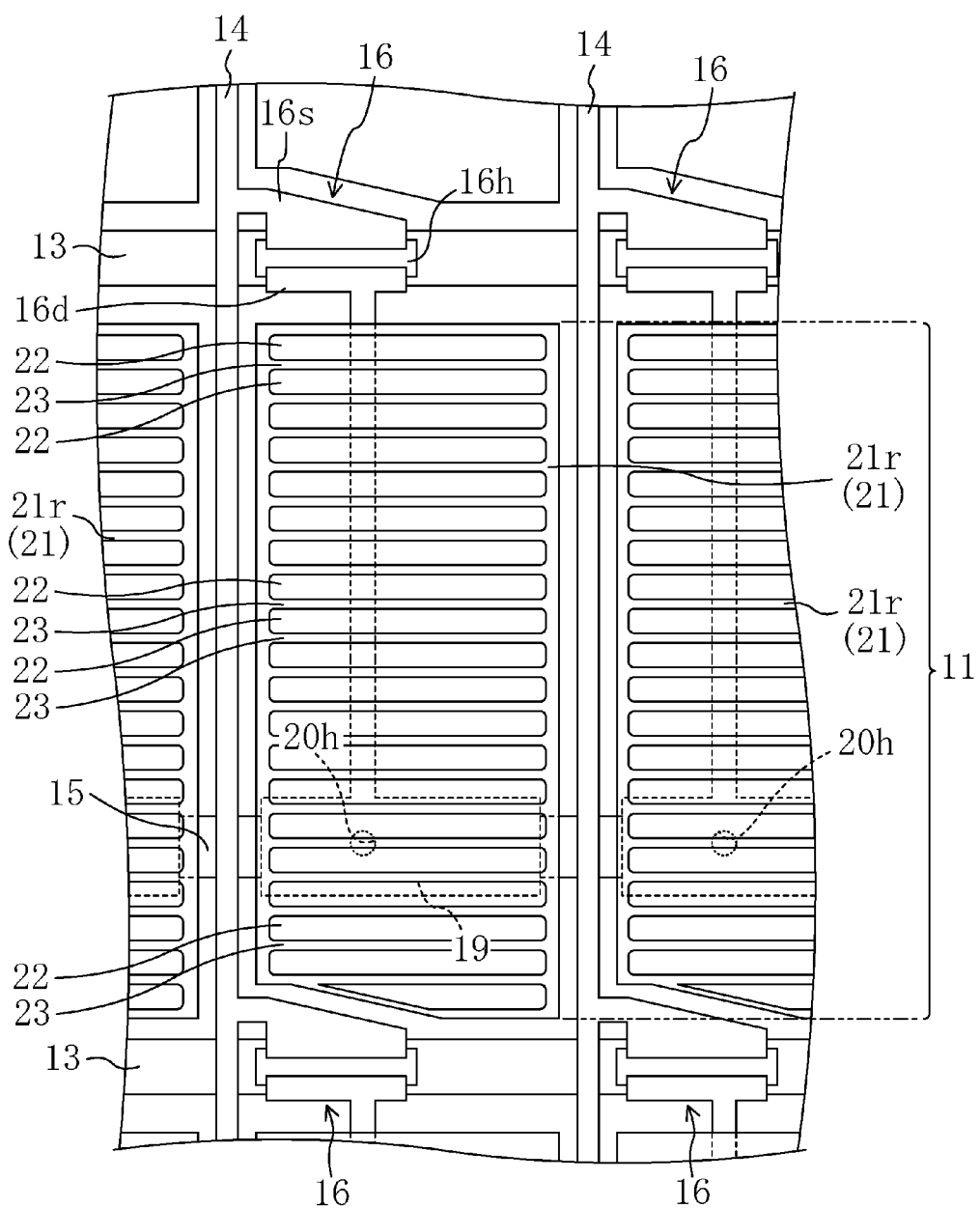
FIG. 13 is a plan view schematically illustrating a part of the TFT substrate of the fourth embodiment.

FIG. 13 illustrates the fourth embodiment of the present invention. FIG. 13 is a plan view schematically illustrating a part of the TFT substrate 10 according to this embodiment.

While the second embodiment described above has assumed that the surface of each of the reflective electrodes 21r is formed with a crease-like, raised and recessed profile where recessed portions 22 and raised portions 23 extend in a random manner, the crease-like, raised and recessed profile of each of the reflective electrodes 21r of this embodiment is formed in a ladder structure as shown in FIG. 13, in which recessed portions 22 and raised portions 23 are provided so as to extend row-wise (in the lateral direction in the figure) in each of the pixels 11 in parallel with each other inside a raised portion 23 having a frame structure, and to lie alternately in stripes column-wise (in the longitudinal direction in the figure) with respect to the pixels 11. Accordingly, the raised and recessed profile of each of the reflective electrodes 21r of this embodiment is formed so that a smaller area of sloped surface faces row-wise in each of the pixels 11, and that the reflectance of light toward the both side portions on the display surface 2s is lower than the reflectance of light toward the front portion on the display surface 2s. The configuration of the other part of the LCD device S of this embodiment is similar to that of the second embodiment described above.

The raised and recessed profiles of the reflective electrodes 21r as described above are formed, in a manufacturing method of the TFT substrate 10, such that when the source bus lines 14 and the drain electrodes 16d are formed, a plurality of patterns extending row-wise and lying in stripes column-wise are formed in each region which will be a pixel 11. Then, by forming the insulating film 20 in a similar way to that of the first embodiment described above, final baking yields recessed portions 22 and raised portions 23 extending along the respective patterns, and thus the raised and recessed profile in a ladder structure is formed on the insulating film 20. Thereafter, formation of the reflective electrodes 21r causes the surface of each of the reflective electrodes 21r to be formed with the raised and recessed profile in a ladder structure, reflecting the raised and recessed profile of the insulating film 20.

Advantages of Fourth Embodiment

Thus, according to the fourth embodiment, variation in brightness can be effectively reduced, and display quality can be improved in the curved LCD device S as with the second embodiment. Moreover, the raised and recessed profile of each of the reflective electrodes 21r allows the reflectance of light at each of the reflective electrodes 21r to be lower in the both side portions on the display surface 2s than in the front portion on the display surface 2s, and thus image displays can be hardly visible from the both side portions of the display surface 2s. Accordingly, intentional reduction in the visibility in the both side portions of the display surface 2s so that image displays are only visible to a user in front can prevent the image displays from being viewed by others.

Other Embodiments

Although the first embodiment described above has been presented in terms of a method for forming the raised and recessed profile on the surface of the insulating film 20 in which ultraviolet light is radiated onto the photosensitive resin film forming the insulating film 20, and then final baking is conducted, the present invention is not limited thereto, the raised and recessed profile may be formed on the surface of the insulating film in such a way that ultraviolet light is radiated onto the photosensitive resin film forming the insulating film, and then the photosensitive resin film is developed, or the raised and recessed profile may be formed on the surface of the insulating film 20 by another known method in which, for example, a pattern is formed on a layer under the insulating film to form the surface of the insulating film with a raised and recessed profile.

In addition, although each of the described embodiments assumes that the raised and recessed profile of each surface of the reflective electrodes 21r is formed with a crease-like profile where the recessed portions and the raised portions extend in a random manner, or is formed in a ladder structure, the present invention is not limited thereto, the raised and recessed profile of the insulating film 20 may be a raised and recessed profile in which a plurality of dot-shaped raised portions are provided at random, or otherwise, various raised and recessed profiles may be used.

Although the fourth embodiment described above has been presented in terms of the reflective LCD device S in which each of the reflective electrodes 21r is configured such that the reflectance of light at each of the reflective electrodes 21r is lower in the both side portions on the display surface 2s than in the front portion on the display surface 2s, the present invention is not limited thereto, the transflective LCD device S may be configured such that the surface of each of the reflective electrodes 21r is formed with a raised and recessed profile in a ladder structure as with the fourth embodiment described above, and thus the reflectance of light at each of the reflective electrodes 21r is lower in the both side portions on the display surface 2s than in the front portion on the display surface 2s. With such a configuration, in the curved transflective LCD device S, the raised and recessed profile of each of the reflective electrodes 21r allows the reflectance of light at each of the reflective electrodes 21r to be lower in the both side portions on the display surface 2s than in the front portion on the display surface 2s, and thus image displays can be hardly visible from the both side portions of the display surface 2s, and can be prevented from being viewed by others.

INDUSTRIAL APPLICABILITY

As described above, the present invention is useful for LCD devices, and more particularly for curved LCD devices in which reduction in variation in brightness and improvement in display quality are demanded.

DESCRIPTION OF REFERENCE CHARACTERS

A First Region
B Second Region
C Third Region
S Liquid Crystal Display (LCD) Device
2 Display Area
2s Display Surface
10 Thin Film Transistor (TFT) Substrate (First Substrate)
11 Pixel
11r Reflection Region
11t Transmission Region
21r Reflective Electrode (Reflection Layer)
30 Color Filter Substrate (Second Substrate)

The invention claimed is:

1. A liquid crystal display device, comprising:
    a first substrate including a plurality of pixels defined thereon, each of which is provided with a reflection layer;
    a second substrate disposed opposite the first substrate; and
    a display surface configured to display images by the plurality of pixels,
    wherein
    the display surface is curved in a curvature direction, and
    a reflectance of light in a direction normal to the display surface in all of the reflection layers located in outer edge portions of the display surface in the curvature direction is higher than a reflectance of light in the direction normal to the display surface in all of the reflection layers located in a middle portion of the display surface in the curvature direction.

2. The liquid crystal display device of claim 1, wherein
    a surface of each of the reflection layers is provided with a raised and recessed profile, and
    the raised and recessed profile of each of the reflection layers is arranged so that the reflectance of light in the direction normal to the display surface in all of the reflection layers located in the outer edge portions of the display surface in the curvature direction is higher than the reflectance of light in the direction normal to the display surface in all of the reflection layers located in the middle portion of the display surface in the curvature direction.

3. The liquid crystal display device of claim 1, wherein
    a display area defined by the plurality of pixels includes
    a first region, provided in the middle portion of the display surface in the curvature direction, where a reflectance of the reflection layers in the first region is a first reflectance,
    second regions, respectively provided on both sides of the first region in the curvature direction, where a reflectance of the reflection layers in the second regions is a second reflectance which is higher than the first reflectance, and
    third regions, respectively provided on opposite sides of the respective second regions from the first region in the curvature direction, where a reflectance of the reflection layers in the third regions is a third reflectance which is higher than the second reflectance.

4. The liquid crystal display device of claim 1, wherein
    each of the plurality of pixels includes a reflection region in which one of the reflection layers is provided and a transmission region in which no reflection layer is provided.

5. The liquid crystal display device of claim 2, wherein
    the raised and recessed profile of each of the reflection layers is arranged so that the reflectance toward a peripheral side of the display surface is lower than the reflectance toward a front side of the display surface.

* * * * *